March 1, 1960  R. A. AMMON  2,927,320
NAVIGATION APPARATUS AND INSTRUMENT THEREFOR
Filed Feb. 24, 1955  3 Sheets-Sheet 1

Inventor
Roscoe A. Ammon
by Roberts, Cushman + Grover
Attys

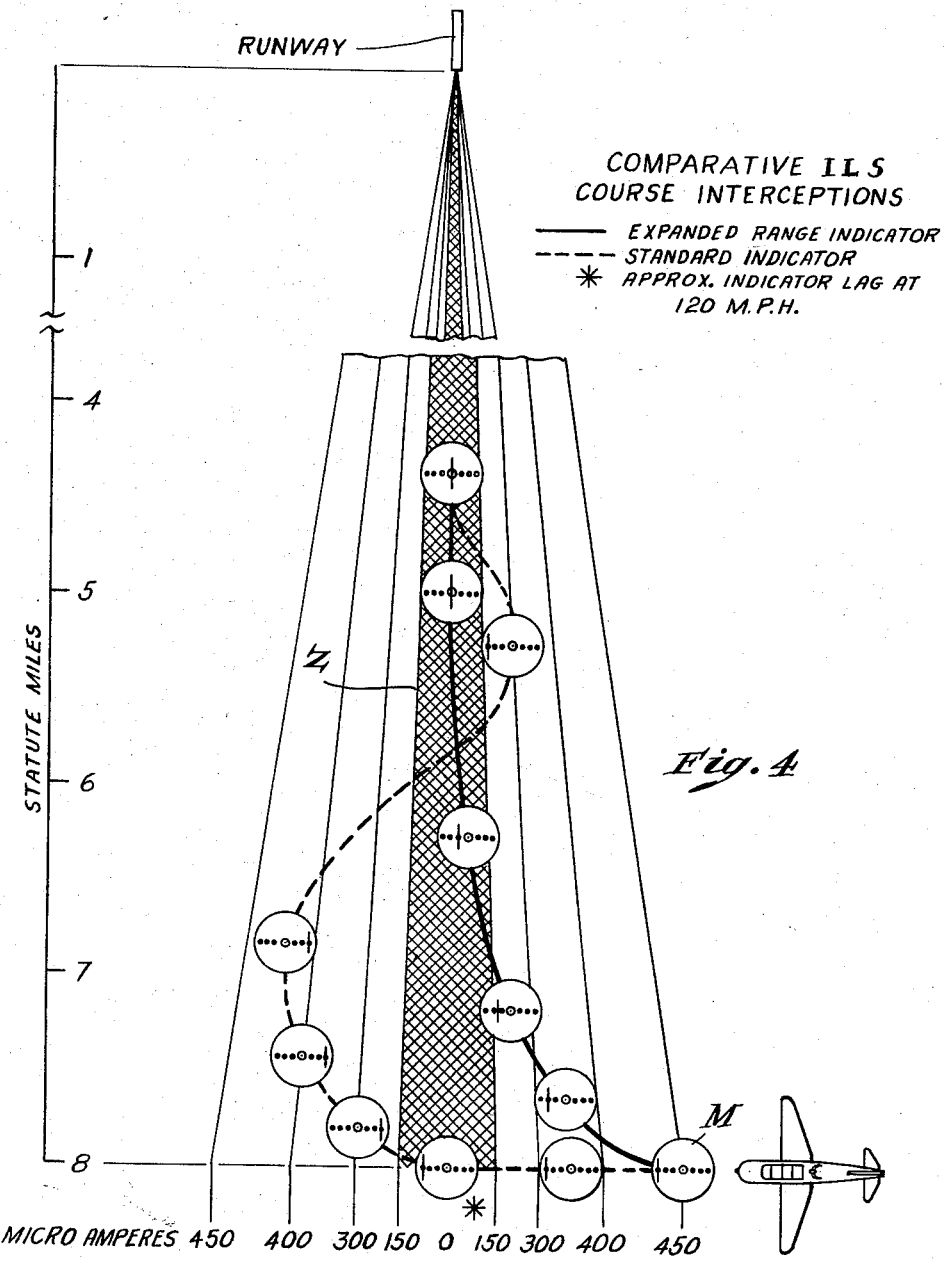

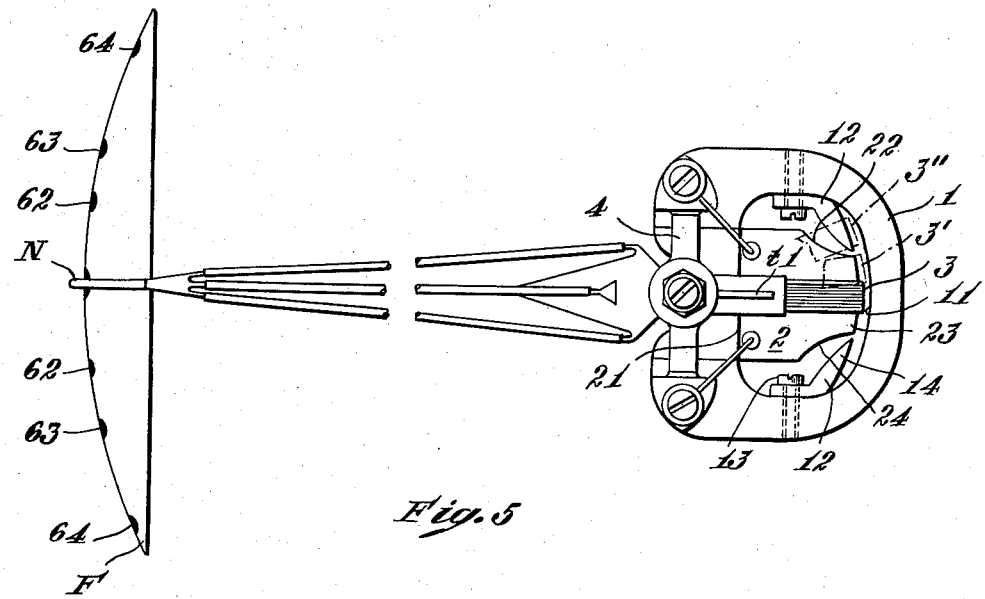

United States Patent Office 2,927,320
Patented Mar. 1, 1960

2,927,320

NAVIGATION APPARATUS AND INSTRUMENT THEREFOR

Roscoe A. Ammon, Manchester, N.H., assignor, by mesne assignments, to Minneapolis-Honeywell Regulator Company, a corporation of Delaware Application February 24, 1955, Serial No. 490,397

14 Claims. (Cl. 343—107)

This invention relates to moving coil instruments and particularly to a meter for use in electronic navigation apparatus.

One application of the invention is in an aircraft instrument landing system such as that commonly known as ILS. The present ILS includes a ground transmitter and an airborne receiver. Along a prescribed course approaching a landing strip the transmitter radiates a beamed carrier which is modulated at different frequencies on either side of the approach course. The receiver detects a signal depending in intensity on the angular deviation of the aircraft and and its receiver from the prescribed course, and further dependent on whether the aircraft is on the right or left of the course. This signal is applied to a meter having a midscale mark at either side of which are scales which indicate whether the aircraft is to the right or left of the prescribed course and within limits how much it is off course. The pilot approaches the landing course at an angle insuring interception of the radio beam. As soon as he intercepts the beam he corrects his heading according to the amount indicated by the meter that he is off course. The sensitivity of the transmitted beam pattern receiver and meter must be such that by correcting his course according to the meter indication he can eventually find the center of the pattern. That is, a slight deviation from the prescribed course must be perceptibly indicated on the meter as a left or right deflection from the midscale, on-course mark.

Hitherto the usable portion of the beam pattern has been narrowly limited to five degrees. That is, a deviation from course of 2½ degrees causes a full deflection either right or left from the normal midscale meter indication. With such a proportion between off course deviation and meter deflection the pilot is able ultimately to find and with adequate precision hold the center of the five degree pattern. However, if the angle at which the aircraft intercepts the landing course or the speed of the aircraft is high it is often necessary for the pilot to fly through the five degree pattern several times, making abrupt changes of course while hunting the course which his meter indicates to be within the five degree pattern. The receiver and meter may lag in indicating the true off-course deviation until it is too late for the pilot to correct heading before having traveled through the five degree beam width. Such course hunting results in much undesirable delay, increases the pilot's burden and fatigue and the passenger's discomfort. For jet aircraft with very high landing speeds the prior systems may be impractical.

Accordingly one object of the present invention is to give an indication in advance of interception of the narrow approach pattern so that the pilot may make a single easy and gradual change of course intercepting the narrow course pattern at a small angle or substantially tangentially, while providing an indication which is of relatively high accuracy when the plane is being held on the prescribed approach course.

According to the invention there is provided a receiver and a moving coil instrument carried by a craft, the receiver including means for detecting the intensity or frequency of the energy in a radiated pattern according to the location of the craft in the pattern and means producing a current proportional to said intensity in a zone adjacent the central course in the pattern and also outside the zone. Preferably the moving coil instrument comprises a magnetized core having a pole face, a yoke having a face spaced from said pole face to define an air gap therebetween and provide a magnetic flux through said gap, and a coil pivotally supported for angular movement in a predetermined arc through the air gap, said yoke face and pole face being uniformly spaced throughout a central portion of said arc so that throughout the central portion the coil is deflected substantially linearly in proportion to coil current, and the yoke and pole faces being increasingly widely spaced from the central portion toward one end of the arc so that in the arc the coil is deflected in decreasing proportion to the coil current, whereby the receiver may detect and the instrument give an indication in the central arc portion in linear proportion to the energy in the said zone adjacent the central course and also give an increasingly accurate indication in the end portion corresponding to the energy in positions approaching the aforesaid zone, thereby to guide the craft tangentially onto the central course.

For the purpose of illustration a typical embodiment of the invention is shown in the drawings in which Fig. 1 is a schematic drawing of the receiver and indicator;

Fig. 4 is a diagrammatic view of an aircraft approach pattern;

Fig. 5 is a plan view of a moving coil instrument; and

Fig. 6 is a side elevation of the instrument.

Figure 1:
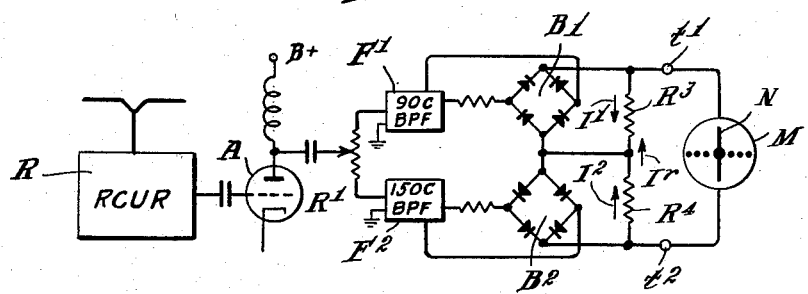

The ILS localizer receiving apparatus shown schematically in Fig. 1 comprises a conventional receiver R with the usual detection and amplifying circuits which receives energy radiated in a pattern comprising two overlapping beams, one modulated at 90 cycles per second and the other modulated at 150 cycles per second. Depending upon the position of the aircraft and its receiver R the receiver will produce at its output a voltage comprising 90 and 150 cycle components. This voltage is applied to an amplifier A which is connected through a balancing potentiometer R1 to two band pass filters F1 and F2. The filters F1 and F2 respectively pass the 90 cycle and 150 cycle components of the voltage to the two bridge rectifiers B1 and B2. Across the output of the bridges are two load resistors R3 and R4 respectively connected to the terminals $t_1$ and $t_2$ of a microammeter M. The bridge rectifiers B1 and B2 in a well known manner rectify the 90 and 150 cycle voltages and thereby produce in resistances R3 and R4 respectively currents indicated by the arrows I1 and I2. The resultant current Ir, which comprises the ultimate receiver output, equals the summation of the two currents I1 and I2. If the receiver is located in the center of the pattern wherein the 90 and 150 cycle beams are equal in intensity the currents $I1$ and $I2$ will be equal and opposite and the resulting current $Ir$ will be zero. In positions at either side of the central line of the radiated pattern one of the beams will be greater in intensity and correspondingly one of the currents $I1$ or $I2$ will be greater resulting in a net current through the terminals $t1$ and $t2$ and the microammeter M. Current through the meter M (which may flow either in the direction shown or in the opposite direction) results in a deflection of its needle N from the center position shown in broken lines in Fig. 3 to a deflected position shown in full lines.

As shown in Figs. 5 and 6 the meter comprises a soft iron yoke 1, a permanent magnet core 2, a moving coil 3 pivotally mounted between an upper bearing bridge 4 and a lower bearing bridge 5, and a needle assembly N attached to the coil 3. At one end of the coil 3 are provided the usual upper and lower bearing staffs 31 and 32 which fit in jewel bearings 41 and 51 secured in bearing screws 42 and 52 which are adjustably attached in the bearing bridges 4 and 5 respectively. An upper coil terminal $t1$ insulatively mounted on the upper bridge 4 is connected to one end of the coil 3 by a hair spring 43. A lower grounded terminal $t2$ is attached to the lower staff 32 through a coil spring 53, the staff in turn being connected to the other end of the coil 3. The needle structure N counterbalances the coil 3.

The yoke 1 has a face 11 curved concentrically with the pivot of the coil 3 in the bearings 41 and 51. The core 2 has a first pole face 21 and a second pole face having three portions 22, 23 and 24. Between the second face 22—23—24 and the yoke face 11 is the air gap through which the coil 3 swings in response to current therethrough. The core face portion 23 is curved concentrically with the pivot of the coil so that the spacing between the portion 23 and the yoke face 11 is substantially uniform. The coil swings through central arc portion one end of which portion is indicated by the broken line position 3'. The flux through the air gap in this central portion is substantially uniform and the coil is therefore deflected substantially linearly in proportion to current while in the central portion. The core faces 22 and 24 however are increasingly widely spaced from the yoke face 11 toward opposite ends of the arc through which the coil 3 swings, one limit of said arc being indicated by the broken line position 3". Outside the central portion of the coil deflection arc the flux density decreases away from the central portion of the arc and consequently the coil 3 is deflected in decreasing proportion to the coil current. That is, opposite the core face 23 equal changes in coil current will produce equal changes in coil deflection, whereas outside the central arc portion opposite the core face 23 equal increases in coil current will produce smaller increases in deflection as the coil moves away from the central arc portion.

To accentuate the decreasing flux intensity outside the central arc portion a pair of magnetic shields 12 are disposed in the air gap opposite the core face 23. The shields 12 are secured by machine screws 13 to a portion of the yoke 1 which is spaced from the air gap, and have a portion extending into the air gap between the core faces 22 and 24 and the yoke face 11. The extended portions 14 are made of soft iron and tapered toward the central arc portion so that the flux density is continuous throughout the whole arc. That is, there is no abrupt change in density between the central arc portion opposite the core face 23 and the end portions 22 and 24.

Figure 2:
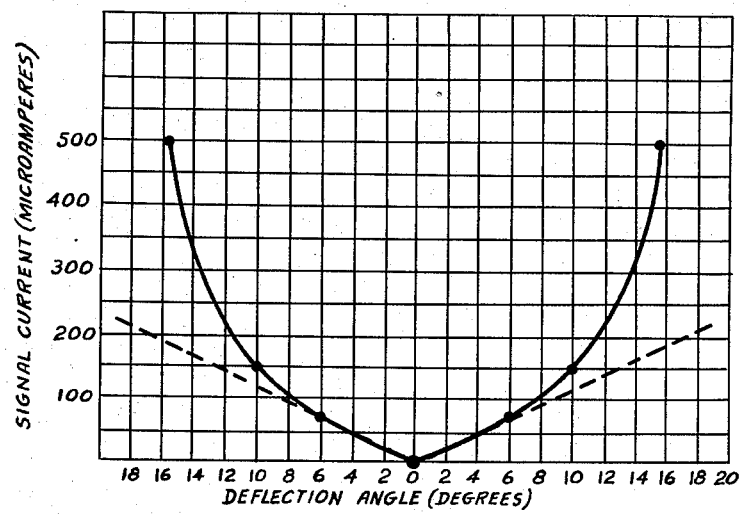
Fig. 2 is a graphic representation of the receiver signal plotted against deflection of the indicating instrument.

In Fig. 2 the deflection of the meter needle throughout a 16° arc is plotted against current through the meter coil. Herein the central arc portion corresponds to a deflection of 6° either side of the zero or center position of the needle whereas the end portions of the deflection arc are located between the 6° and the 16° coordinate. The curve shown in full line in Fig. 2 indicates that in the end portions of the arc an increase in signal current produces increasingly non-linear or less angular deflection toward the end portion of the arc, that the deflection curve approaches tangentially a linear deflection portion between 0 and 6° and that the non-linear portion is substantially continuous with the linear portion.

In Fig. 2 is shown in broken lines the deflection of the meter for the corresponding receiver signal of a conventional ILS receiver. It will be noted that whereas the receiver is capable of producing an accurate signal with an amplitude of at least 450 microamperes the conventional system reaches full scale deflection of approximately 16° with a receiver output signal of between 150 and 200 microamperes.

Figure 3:
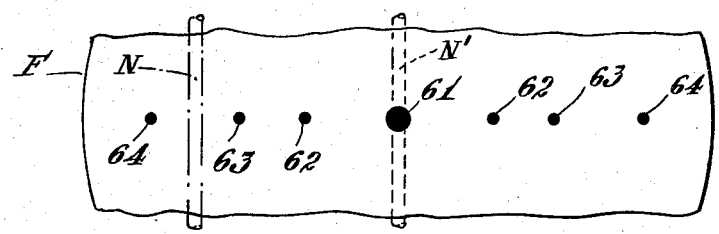
Fig. 3 is a front elevation of the indicating instrument parts being broken away.

The operation of the present invention as compared with conventional systems may be seen with reference to Figs. 3 and 4. In Fig. 4 an aircraft approach course is at the center of a shaded 5° zone Z extending from an aircraft runway. The radiated signal energy, however, extends a considerable distance to either side of the central zone Z. For instance at a distance of 8 statute miles from the runway there is an appreciable transmitted signal energy level approximately 1.25 statute miles to either side of the course.

Shown in broken lines is the approach path attainable with conventional equipment. Shown in full line is the approach path afforded by the present invention. Along each path at various positions relative to the central course are shown the meter readings of the conventional and of the present system.

Following the broken line approach path of Fig. 4 it will be seen that the conventional system gives a full scale meter deflection at any position outside the 5° zone Z. To insure interception of the approach course the pilot must intersect the course at nearly 90°, and owing to the fact that the indication on the meter M lags the actual position of the aircraft relative to the zone, the conventional meter does not begin to deflect until the zone is intercepted. At this time it is too late to correct the course of the aircraft, and as a consequence the craft quickly passes through the zone to a position which causes a full scale deflection of the meter in the opposite direction. The pilot may then correct the course and intercept at a smaller angle, but it frequently happens that two or more interceptions are required before a pilot can approach at an angle small enough to permit a final correction holding the craft within the central zone Z.

In contrast, equipment constructed according to the present invention gives a small but perceptible meter deflection when the aircraft is well outside the 5° zone. For example, at eight statute miles from the landing runway the meter will begin to deflect approximately a mile out of the central zone permitting the pilot to correct his course so as to intercept the central zone at a very small angle. As the aircraft approaches the central zone it gives an increasingly accurate indication of the position of the aircraft so that as the craft enters the zone where the meter deflections are substantially linearly proportional to the aircraft position there will be a continuity of off-course indications to the pilot.

On the face F of the meter dial are a mid-scale spot 61 and graduated marks 62, 63 and 64. Deflection of the needle N between the mark 62 and the mark 64 indicate a position outside the central zone while deflections of the needle between the mark 62 and the mid-scale mark 61 indicate positions inside the central zone Z. Thus the pilot is informed that a meter indication between mark 63 and mark 64 is not as accurate as the indication between mark 62 and mark 63, and further that as the needle swings inside the mark 62 the craft has entered the central zone and consequently smaller course corrections are necessary to bring the craft to the central course as indicated by the mid-scale mark 61.

It should be understood that the present disclosure is for the purpose of illustration only and that the invention contemplates other equivalent means for giving an advance warning of approach to the zone Z and increasingly accurate meter indications as the zone Z is approached. Thus this invention includes all modications and equivalents which fall within the scope of the appended claims.

I claim:

1. For receiving a signal radiated in a pattern having a characteristic varying in a zone at each side of a navigation course and also outside said zone, craft borne apparatus comprising a receiver including means for detecting the intensity of said pattern, said means producing a current proportional to said intensity at positions in said zone and outside said zone, a current measuring instrument for indicating said current, and means for applying said current to said instrument, said instrument including a magnetic field structure forming an air gap in which the magnetic flux is uniform in one portion of the gap and increasingly attenuated outside said portion so as to cause deflection of said instrument in substantially linear proportion to said intensity within said zone and to cause deflection in decreasing proportion to said intensity in positions extending away from said zone, whereby said receiver causes said instrument to indicate positions of said craft in said zone substantially accurately and to indicate positions approaching said zone with increasing accuracy so that said craft may be navigated tangentially into said zone during one approach thereto.

2. For receiving a signal radiated in a pattern having a characteristic varying in a zone at each side of a navigation course and also outside said zone, craft borne apparatus comprising a receiver including means for detecting the intensity of said pattern, said means producing a current proportional to said intensity at positions in said zone and outside said zone; and a moving coil instrument including a magnetized core having a pole face, a yoke having a face spaced from said pole face to define an air gap therebetween and provide a magnetic flux through said gap and a coil pivotally supported for angular movement in a predetermined arc through the air gap, said yoke face and pole face being uniformly spaced throughout a central portion of said arc so that throughout said central arc portion said coil is deflected substantially linearly in proportion to coil current, and said faces being increasingly widely spaced from said central portion toward one end of said arc, so that in said arc end said coil is deflected in decreasing proportion to coil current; and means connecting said receiver and instrument for applying said receiver current to said coil, whereby said receiver may detect and said instrument give an indication in said central arc portion in linear proportion to the energy in said zone and also give an increasingly accurate indication in said end portion corresponding to the energy in positions approaching said zone, thereby to guide said craft tangentially into said zone in one approach thereto.

3. For receiving a signal radiated in a pattern having a characteristic varying in a zone at each side of a navigation course and also outside said zone, craft borne apparatus comprising a receiver including means for detecting the intensity of said pattern, said means producing a current proportional to said intensity at positions in said zone and outside said zone; and a moving coil instrument including a magnetized core having a pole face, a yoke having a face spaced from said pole face to define an air gap therebetween and provide a magnetic flux through said gap, a coil surrounding said core and pivotally supported for angular movement in a predetermined arc through the air gap, said yoke face and pole face being uniformly spaced throughout a central portion of said arc so that throughout said central arc portion said coil is deflected substantially linearly in proportion to coil current, and said faces being increasingly widely spaced from said central portion toward one end of said arc, and a magnetic shield mounted on said yoke and having a portion extending between said pole face and arc end, said shield portion being tapered through said arc end toward said central arc portion so as to provide an increasingly attenuated flux along said arc end, whereby in said arc end said coil is deflected in decreasing proportion to coil current; and means connecting said receiver and instrument for applying said receiver current to said coil, whereby said receiver may detect and said instrument give an indication in said central arc portion in linear proportion to the energy in said zone and also give an increasingly accurate indication in said end portion corresponding to the energy in positions approaching said zone, thereby to guide said craft tangentially into said zone on one approach thereto.

4. A meter movement comprising a magnetized core having a pole face, a yoke having a face spaced from said pole face to define an air gap therebetween and provide a magnetic flux through said gap, a coil surrounding said core and pivotally supported for angular movement in a predetermined arc through the air gap, said yoke face and pole face being uniformly spaced throughout a central portion of said arc so that throughout said central arc portion the flux is of substantially uniform density and said coil is deflected substantially linearly in proportion to coil current, and said faces being increasingly widely spaced from said central portion toward one end of said arc, and a magnetic shield mounted on a portion of said yoke spaced from the air gap and disposed between said pole face and arc end so as to provide an increasingly attenuated flux along said arc end, whereby in said arc end said coil is deflected in decreasing proportion to coil current.

5. A meter movement comprising a magnetized core having a pole face, a yoke having a face spaced from said pole face to define an air gap therebetween and provide a magnetic flux through said gap, a coil surrounding said core and pivotally supported for angular movement in a predetermined arc through the air gap, said yoke face and pole face being uniformly spaced throughout a central portion of said arc so that throughout said central arc portion the flux is of substantially uniform density and said coil is deflected substantially linearly in proportion to coil current, and said faces being increasingly widely spaced from said central portion toward one end of said arc, and a magnetic shield mounted on a portion of said yoke spaced from the air gap and disposed between said pole face and arc end so as to provide an increasingly attenuated flux along said arc end, whereby in said arc end said coil is deflected in decreasing proportion to coil current, said shield extending substantially to said central portion so that the magnetic flux is substantially continuous between said central and end portions of said arc.

6. A meter movement comprising a magnetized core having a pole face, a yoke having a face spaced from said pole face to define an air gap therebetween and provide a magnetic flux through said gap, a coil surrounding said core and pivotally supported for angular movement in a predetermined arc through the air gap, said yoke face and pole face being uniformly spaced throughout a central portion of said arc so that throughout said central arc portion said coil is deflected substantially linearly in proportion to coil current, and said faces being increasingly widely spaced from said central portion toward one end of said arc, and a magnetic shield mounted on a portion of said yoke spaced from the air gap and having a portion extending between said pole face and arc end, said shield portion being tapered through said arc end toward said central arc portion so as to provide an increasingly attenuated flux along said arc end, whereby in said arc end said coil is deflected in decreasing proportion to coil current.

7. A meter movement comprising a magnetized core having a pole face and a grain structure sharply oriented toward said face, a yoke having a face spaced from said pole face to define an air gap therebetween and provide a magnetic flux through said gap, a coil surrounding said core and pivotally supported for angular movement in a predetermined arc through the air gap, said yoke face and pole face being uniformly spaced throughout a central portion of said arc so that throughout said central arc portion said coil is deflected substantially linearly in proportion to coil current, and said faces being increasingly widely spaced from said central portion toward one end of said arc, and a magnetic shield mounted on a portion of said yoke spaced from the air gap and disposed between said pole face and arc end so as to provide an increasingly attenuated flux along said arc end, whereby in said arc end said coil is deflected in decreasing proportion to coil current.

8. A meter movement comprising a magnetized core having a pole face, a yoke having a face spaced from said pole face to define an air gap therebetween and provide a magnetic flux through said gap, a coil surrounding said core and pivotally supported for angular movement in a predetermined arc through the air gap, said yoke face and pole face being uniformly spaced throughout a central portion of said arc so that throughout said central arc portion said coil is deflected substantially linearly in proportion to coil current, and said faces being increasingly widely spaced from said central portion toward one end of said arc, and a magnetic shield mounted on a portion of said yoke spaced from said yoke face and disposed between said pole face and arc end so as to provide an increasingly attenuated flux along said arc end, whereby in said arc end said coil is deflected in decreasing proportion to coil current.

9. A meter movement comprising a magnetized core having pole faces on opposite sides thereof, a yoke having a face spaced from one of said pole faces to define an air gap therebetween and provide a magnetic flux through said gap, said yoke having an arm extending between said yoke face and the other of said pole faces, a coil surrounding said core and pivotally supported for angular movement in a predetermined arc through the air gap, said yoke face and pole face being uniformly spaced throughout a central portion of said arc so that throughout said central arc portion said coil is deflected substantially linearly in proportion to coil current, and said faces being increasingly widely spaced from said central portion toward opposite ends of said arc, and a magnetic shield mounted on said yoke arm and disposed between said pole face and arc ends so as to provide an increasingly attenuated flux in said arc ends, whereby in said arc ends said coil is deflected in decreasing proportion to coil current.

10. Craft borne apparatus comprising a source of signals varying so as to represent positions of the craft in a zone at each side of a navigation course and also positions outside said zone, a moving coil instrument, and means interconnecting the source and instrument to apply said signal to the instrument and cause deflection of said coil, said instrument including magnetic means forming an air gap in which magnetic flux is uniform in at least one portion of the gap so as to cause deflection of the coil through said portion in linear proportion to signals representing positions within said zone, and means to cause deflection in decreased amount for signals representing positions outside said zone, whereby said signal source causes said instrument to indicate accurately small changes of position in said zone and to indicate only larger changes in position while approaching said zone.

11. For receiving a signal radiated in a pattern having a characteristic varying in a zone at each side of a navigation course and also outside said zone, craft borne apparatus comprising a receiver including means detecting said signals so as to produce a current representing positions of the craft in said zone and also positions outside said zone, a moving coil instrument, and means interconnecting the receiver and instrument to apply said curret to the instrument and cause deflection of said coil, said instrument including magnetic means forming an air gap in which magnetic flux is uniform in at least one portion of the gap so as to cause deflection of the coil through said portion in linear proportion to current representing positions within said zone, and means to cause deflection in decreased amount for current representing positions outside said zone, whereby said receiver causes said instrument to indicate accurately small changes of position in said zone and to indicate only large changes in position while approaching said zone.

12. For receiving a signal radiated in a pattern having a characteristic varying in a zone at each side of a navigation course and also outside said zone, craft borne apparatus comprising a source of signals varying so as to represent positions of the craft in a zone at each side of a navigation course and also positions outside said zone, a moving coil instrument, and means interconnecting the source and instrument to apply said signal to the instrument and cause deflection of said coil, said instrument including magnetic means forming an air gap in which magnetic flux is uniform in at least the central portion of the gap so as to cause deflection of the coil through said portion in linear proportion to signals representing positions within said zone, and means normally holding the coil in the middle of said central gap portion and opposing deflection of the coil from said middle, and additional means to cause deflection in decreased amount for signals representing positions at either side outside said zone, whereby said signal source causes said instrument to indicate accurately small changes of position in said zone by deflection in said central portion to either side of said middle, and by control of said additional means to indicate only larger changes in position while approaching said zone.

13. Craft borne apparatus comprising a source of signals varying so as to represent positions of the craft in a zone at each side of a navigation course and also positions outside said zone, a moving coil instrument, and means interconnecting the source and instrument to apply said signal to the instrument and cause deflection of said coil, said instrument including a magnetized core having a pole face and a yoke having a face spaced from said pole face to define an air gap therebetween in which magnetic flux is uniform in at least one portion of the gap so as to cause deflection of the coil through said portion in linear proportion to signals representing positions within said zone, and a magnetic shield mounted on a portion of said yoke spaced from said air gap and disposed outside the aforesaid gap portion so as to attenuate the flux outside said portion and thereby to cause deflection in decreased amount for signals representing positions outside said zone, whereby said signal source causes said instrument to indicate accurately small changes of position in said zone and to indicate only larger changes in position while approaching said zone.

14. Craft borne apparatus comprising a signal source producing current varying so as to represent positions of the craft in a zone at each side of a navigation course and also positions outside said zone, a moving coil instrument, and means interconnecting the source and instrument to apply said current to the instrument; said instrument comprising magnetic means including a magnetic core having two opposite poles and a body of magnetic material having a face spaced from one of said poles to define an air gap therebetween, said body being joined to the other of said core poles to form a flux path between the poles and one of said core and body being magnetized to provide a magnetic flux through said air gap which is uniform in at least one portion of the gap, a coil having a side extending through said air gap, the coil being pivoted at an opposite side thereof and at said other core pole so as to straddle the core, said coil being adapted for deflection throughout an arc through said air gap in response to current through said coil, said means forming an air gap in which magnetic flux is uniform in at least one portion of the gap so as to cause deflection of the coil through said portion in linear proportion to signals representing positions within said zone; and means to cause deflection in decreased amount for signals representing positions outside said zone, whereby said signal source causes said instrument to indicate accurately small changes of position in said zone and to indicate only larger changes in position while approaching said zone.

References Cited in the file of this patent

UNITED STATES PATENTS

| | | |
|---|---|---|
| 2,051,966 | Runge | Aug. 25, 1936 |
| 2,357,524 | Klepp | Sept. 5, 1944 |
| 2,400,308 | Klepp | May 14, 1946 |
| 2,439,044 | Ferrill | Apr. 6, 1948 |
| 2,509,893 | Taylor, et al. | May 30, 1950 |
| 2,518,609 | Fogle | Aug. 15, 1950 |
| 2,730,009 | Poirette | Jan. 10, 1956 |